(12) United States Patent
Meyvaert et al.

(10) Patent No.: US 10,236,766 B2
(45) Date of Patent: Mar. 19, 2019

(54) CHARGE RECYCLING SWITCHED CAPACITOR REGULATORS

(71) Applicant: Lion Semiconductor Inc., San Francisco, CA (US)

(72) Inventors: Hans Meyvaert, Oakland, CA (US); Alberto Alessandro Angelo Puggelli, Oakland, CA (US)

(73) Assignee: Lion Semiconductor Inc., San Francisco, CA (US)

( * ) Notice: Subject to any disclaimer, the term of this patent is extended or adjusted under 35 U.S.C. 154(b) by 0 days.

(21) Appl. No.: 15/801,106

(22) Filed: Nov. 1, 2017

(65) Prior Publication Data

US 2018/0123452 A1 May 3, 2018

Related U.S. Application Data

(60) Provisional application No. 62/415,833, filed on Nov. 1, 2016.

(51) Int. Cl.
*H02M 3/07* (2006.01)
*H02M 1/088* (2006.01)

(52) U.S. Cl.
CPC .............. *H02M 3/07* (2013.01); *H02M 1/088* (2013.01)

(58) Field of Classification Search
CPC ............ H02M 3/00; H02M 3/04; H02M 3/07; H02M 3/155; H02M 3/156; H02M 3/157; H02M 3/158; H02M 2001/0067; H02M 2001/007; H02M 1/08; H02M 1/088; G05F 1/59; G05F 5/00

USPC .................. 323/268, 282, 283, 299, 300
See application file for complete search history.

(56) References Cited

U.S. PATENT DOCUMENTS

| 8,823,342 | B2 | 9/2014 | Williams | |
|---|---|---|---|---|
| 9,143,032 | B2 * | 9/2015 | Le | ........... H02M 3/156 |
| 9,276,562 | B2 | 3/2016 | Saadat et al. | |
| 9,899,919 | B2 * | 2/2018 | Crossley | ................. H02M 1/14 |
| 2002/0041178 | A1 * | 4/2002 | Hiraki | ........................ G06F 1/26 |
| | | | | 323/272 |
| 2007/0133338 | A1 * | 6/2007 | Hoffmann | ............ G11C 7/1078 |
| | | | | 365/233.18 |
| 2007/0200538 | A1 * | 8/2007 | Tang | ..................... H02M 3/157 |
| | | | | 323/237 |

(Continued)

OTHER PUBLICATIONS

International Search Report and Written Opinion dated Jan. 19, 2018 in International Patent Application No. PCT/2017/059582.

*Primary Examiner* — Adolf Berhane
(74) *Attorney, Agent, or Firm* — Byrne Poh LLP

(57) ABSTRACT

A voltage regulator comprising: a first regulator module comprising a first transistor switch, wherein the first module operates in a first phase and wherein the first switch is configured to receive a first signal at a first gate of the first switch from a first signal driver; a second regulator module comprising a second transistor switch, wherein the second module operates in a second phase that is different from the first phase, wherein the second switch is configured to receive a second gate drive signal at a second gate of the second switch from a second signal driver, and wherein the second signal is opposite in polarity from the first signal; and a switch that couples the first gate and the second gate during at least part of a time period during which the first switch transitions states and the second switch transitions states.

8 Claims, 14 Drawing Sheets

(56) References Cited

U.S. PATENT DOCUMENTS

| | | | |
|---|---|---|---|
| 2010/0013304 A1* | 1/2010 | Heineman | G06F 1/26 |
| | | | 307/31 |
| 2010/0019807 A1 | 1/2010 | Zhang et al. | |
| 2011/0188218 A1 | 8/2011 | Hsing et al. | |
| 2013/0265029 A1* | 10/2013 | Akiyama | H03K 17/94 |
| | | | 323/311 |
| 2014/0247025 A1* | 9/2014 | Dally | G05F 1/10 |
| | | | 323/271 |
| 2014/0268945 A1 | 9/2014 | Low et al. | |
| 2014/0306673 A1 | 10/2014 | Le et al. | |
| 2015/0381026 A1* | 12/2015 | Tournatory | H02M 3/158 |
| | | | 323/271 |
| 2017/0300079 A1* | 10/2017 | Puggelli | G05F 5/00 |

* cited by examiner

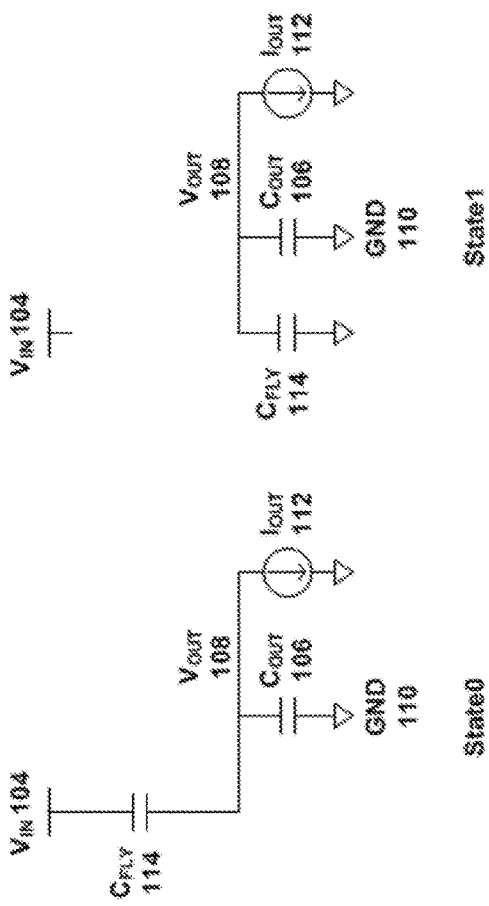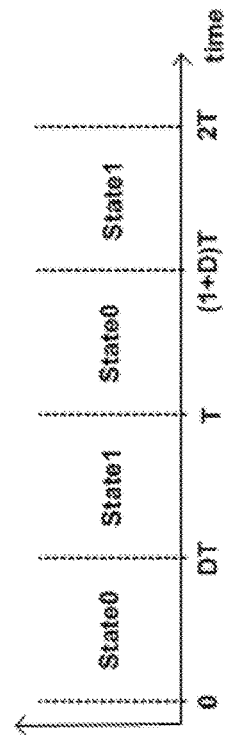

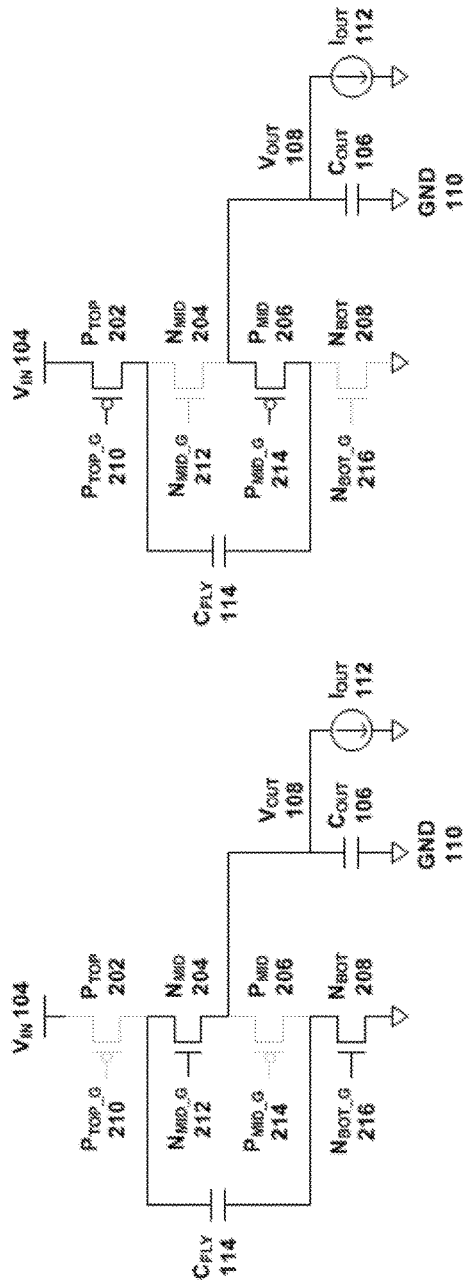
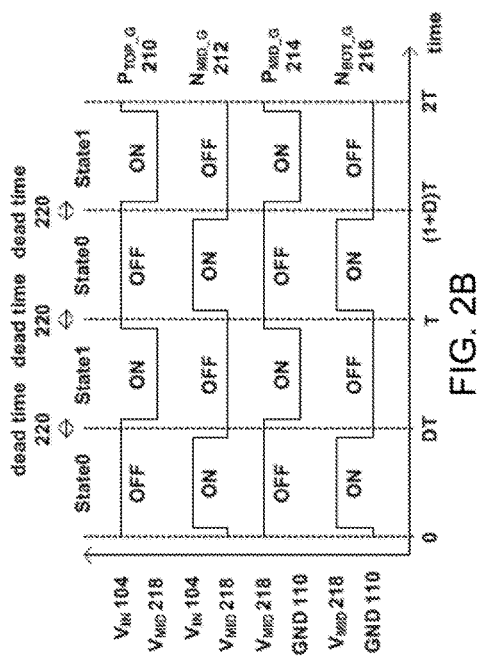
FIG. 2A
FIG. 2B

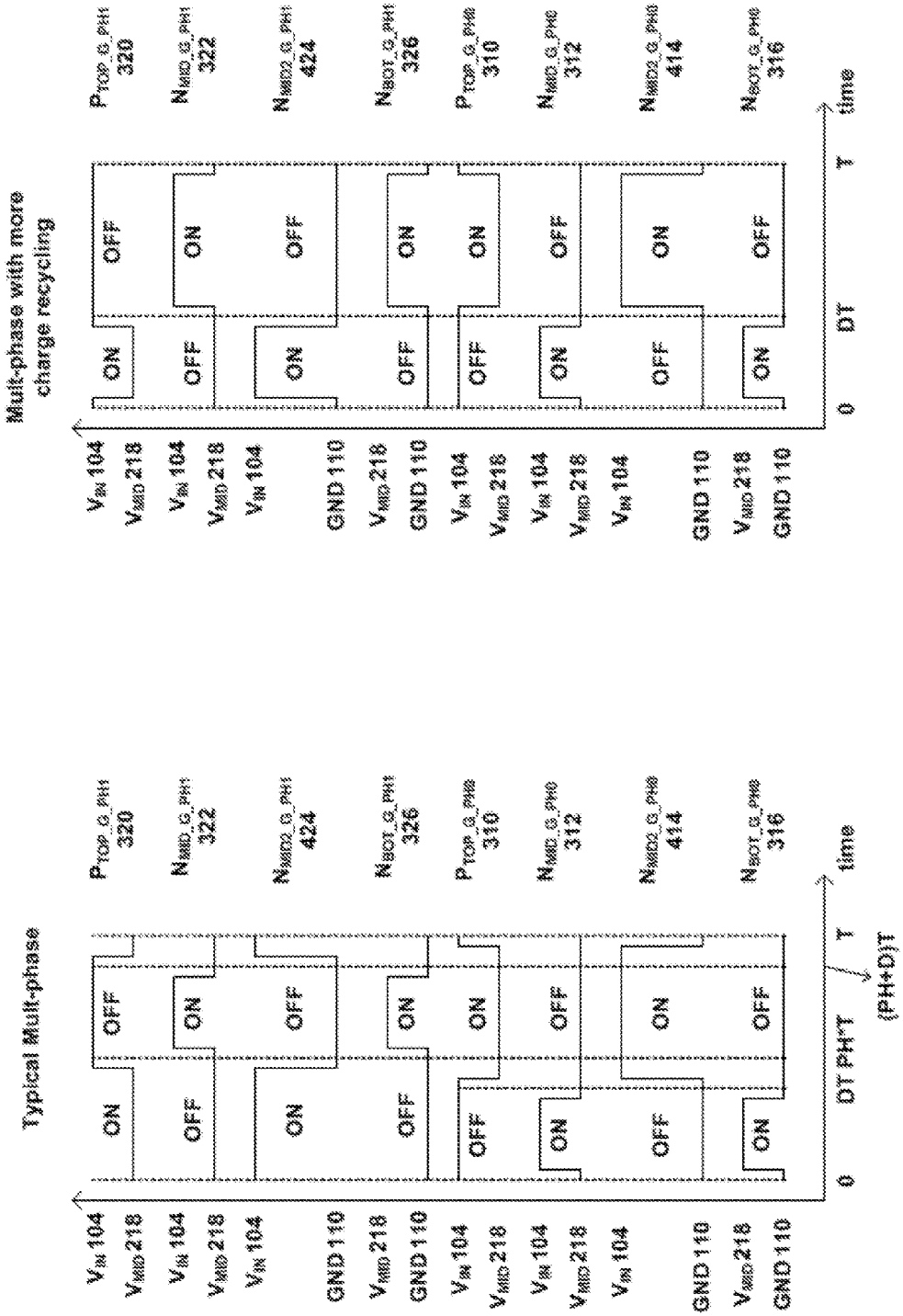

CHARGE RECYCLING SWITCHED CAPACITOR REGULATORS

CROSS-REFERENCE TO RELATED APPLICATION

This application claims the benefit of U.S. Provisional Patent Application No. 62/415,833, filed Nov. 1, 2016, which is hereby incorporated by reference herein in its entirety.

TECHNICAL FIELD

The present disclosure relates to apparatuses, systems, and methods relating to a charge recycling switched capacitor regulators.

BACKGROUND

There is a strong demand to reduce the size of electronic systems. The size reduction is especially desirable in mobile electronics where space is a premium, but is also desirable in servers that are placed in big data centers since it is important to squeeze in as many servers as possible in fixed-size real estate.

One of the largest components in electronic systems is a voltage regulator (also referred to as a power regulator) that provides power to integrated chips, such as processors, memory devices (e.g., a dynamic random access memory (DRAM)), radio-frequency (RF) chips, WiFi combo chips, and power amplifiers. A power regulator often includes a large number of bulky off-chip components, and these components limit the size reduction of power regulators.

One type of power regulator that does not require a large number of bulky off-chip components is a switched capacitor regulator. A switched capacitor regulator can use capacitors that are integrated "on-chip," which tend to be significantly smaller than off-chip components. Therefore, an "on-chip" switched capacitor regulator can be significantly smaller than other types of regulators that use off-chip components, such as a buck regulator. An on-chip switched capacitor regulator is desirable also because it is known to be efficient even at a high voltage conversion ratio as long as the voltage conversion ratio is an integer number.

Unfortunately, the efficiency of a switched capacitor regulator is limited due to parasitic capacitances that are inevitably present in circuits. Therefore, there is a strong need to provide a power regulator that is capable of attaining a high efficiency even in the presence of parasitic capacitances.

SUMMARY

In accordance with some embodiments, charge recycling switched capacitor regulators are provided. In some embodiments, voltage regulators are provided, the voltage regulators comprising: a first regulator module comprising a first transistor switch, wherein the first regulator module operates in a first phase and wherein the first transistor switch is configured to receive a first gate drive signal at a gate of the first transistor switch from a first signal driver; a second regulator module comprising a second transistor switch, wherein the second regulator module operates in a second phase that is different from the first phase, wherein the second transistor switch is configured to receive a second gate drive signal at a gate of the second transistor switch from a second signal driver, and wherein the second gate drive signal is opposite in polarity from the first gate drive signal; and a switch that couples the gate of the first transistor switch and the gate of the second transistor switch during at least part of a time period during which the first transistor switch transitions from one state to another and the second transistor switch transitions from one state to another.

In some embodiments of these voltage regulators, when the switch couples the gate of the first transistor switch and the gate of the second transistor switch, the first signal driver and the second signal driver are each configured to have a high output impedance.

In some embodiments of these voltage regulators, when a difference between a first voltage level at the gate of the first transistor switch and a second voltage level at the gate of the second transistor switch is less than a predetermined threshold, the switch opens.

In some embodiments of these voltage regulators, when a difference between a first voltage level at the gate of the first transistor switch and a second voltage level at the gate of the second transistor switch is less than a predetermined threshold, the switch opens. In some embodiments of these voltage regulators, when the switch is opened, the first signal driver and the second signal driver are each configured to not have a high output impedance.

In some embodiments of these voltage regulators, when after the switch has been coupling the gate of the first transistor switch and the gate of the second transistor switch for a predetermined period of time, the switch opens. In some embodiments of these voltage regulators, when the switch is opened, the first signal driver and the second signal driver are each configured to not have a high output impedance.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 1A-1B illustrates an example of a 2:1 switched capacitor (SC) regulator.

FIGS. 2A-2B illustrate an example of the operation of a switch matrix in an example 2:1 SC regulator.

FIGS. 6A-6B illustrate an example of a multi-phase SC regulator with regulator modules operating with various duty cycles in accordance with some embodiments.

DETAILED DESCRIPTION

Figure 3A:
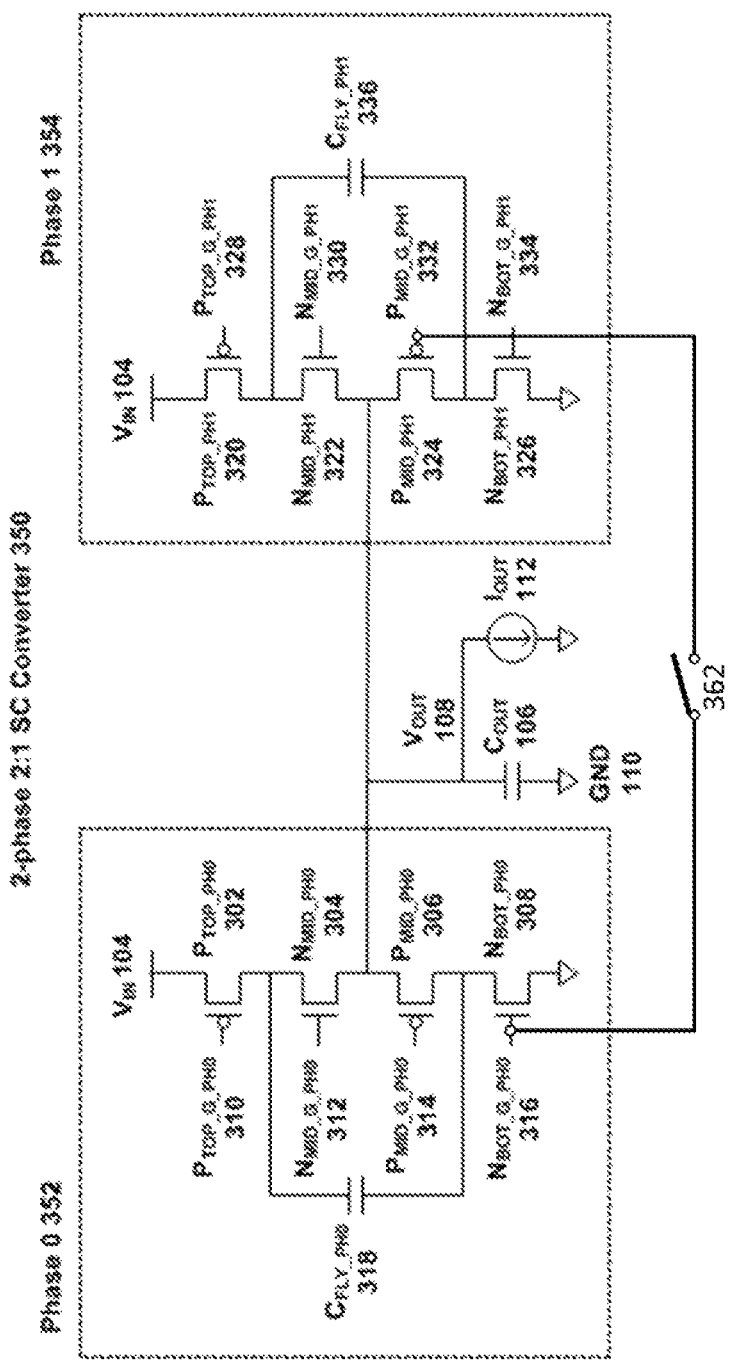
FIGS. 3A-3C illustrate an example of the operation of an example of a charge-recycling two phase SC regulator in accordance with some embodiments.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are for purposes of illustration, and that it is contemplated that there are other systems and methods that are within the scope of the disclosed subject matter.

Modern electronic systems have been tightly integrated as a system-on-chip (SoC) that incorporates multiple processing cores and heterogeneous components (e.g., memory controllers, hardware accelerators) within a single chip. The popularity of SoCs, coupled with tighter power budgets, motivates controlling the voltage and frequency at a block-specific granularity. The block-specific voltage control can allow the electronic system to raise only the voltage of the computing blocks (e.g., processor cores) that desires higher performance. Such a block-specific voltage control can improve power and/or performance.

However, traditional approaches of dynamic voltage and frequency scaling (DVFS) have been performed at a coarse-grain level due to cost and size limitations of off-chip voltage regulators. Moreover, traditional DVFS schemes were limited to a slow voltage/frequency scaling at the micro-second timescale due to the slow speed of off-chip voltage regulators. Faster DVFS in the nano-second timescale can save significantly more power consumed by the SoC by closely tracking the SoC voltage to the rapidly changing computation demand.

Given the limitations of off-chip voltage regulators, there has been a surge of interest in integrated voltage regulators (IVR)—a voltage regulator that is integrated with other components (e.g., processor cores) in a single chip or in a single package—to reduce the size of the printed circuit board and to enable nano-second timescale, per-core DVFS. Examples of IVRs are provided in "System Level Analysis of Fast, Per-Core DVFS using On-Chip Switching Regulators," published in IEEE International Symposium on High-Performance Computer Architecture (HPCA) in February 2008, by Wonyoung Kim et al.; an article entitled "Design Techniques for Fully Integrated Switched-Capacitor DC-DC Regulators," published in IEEE Journal of Solid-State Circuits (JSSC) in September 2011, by Hanh-Phuc Le et al.; and an article entitled "A Fully-Integrated 3-Level DC/DC Regulator for Nanosecond-Scale DVFS," published in IEEE Journal of Solid-State Circuits (JSSC) in January 2012, by Wonyoung Kim et al., each of which is hereby incorporated by reference herein in its entirety.

An IVR can include a switched capacitor (SC) regulator. An SC regulator can use one or more capacitors, instead of inductors, to transfer charge from a power source to an output load. The SC regulator can control the output voltage by changing the configuration and the sequence in which capacitors are connected to one another.

An SC regulator can be efficient even at a high voltage conversion ratio (a ratio between an input voltage and an output voltage of the SC regulator) as long as the voltage conversion ratio is a ratio of integer numbers. However, the efficiency of an SC regulator can degrade when the voltage conversion ratio is not a ratio of integer numbers. For example, an SC regulator can achieve high efficiencies at when the output voltage is ½, ⅓, ⅔, ⅖, ⅗ of the input voltage. However, the same switched capacitor regulator can fail to provide high efficiencies when the output voltage deviates from those values. This is a problem for many SoCs that operate within a continuous range of voltages, or a range of voltages in 5-10 mV steps.

FIG. 1A illustrates an example 102 of a 2:1 SC regulator that is capable of achieving a high efficiency when the voltage conversion ratio is 2:1. The SC regulator includes capacitors $C_{FLY}$ 114 and $C_{OUT}$ 106. The SC regulator also includes a switch matrix including a plurality of switches, which is not shown in FIG. 1A for simplicity.

In an SC regulator, the switched capacitor $C_{FLY}$ 114 can be connected in a variety of arrangements depending on the configuration of the switch matrix (e.g., the open or closed state of switches in the switched matrix). In contrast, the decoupling capacitor $C_{OUT}$ 106 is always coupled to the output $V_{OUT}$ 108 to reduce noise on the output. The decoupling capacitor $C_{OUT}$ 106 is usually a large capacitor that reduces the noise or ripple of the output voltage $V_{OUT}$ 108.

Depending on the configuration of the switch matrix, the switched capacitor regulator can be in State 0 or State 1. The switches can turn on and off periodically (e.g., at a certain frequency) so that the switched capacitor $C_{FLY}$ 114 alternates between State 0 and 1 periodically as well. As shown in FIG. 1B, the regulator can spend the time period [0, D*T] in State 0 and the time period [D*T, T] in State 1.

In State 1, the voltage $V_{SW1}$ across the switch capacitor $C_{FLY}$ 114 is equal to the output voltage $V_{OUT}$ 108. Assuming that the switched capacitor $C_{FLY}$ 114 is large enough, the voltage $V_{SW1}$ can stay roughly the same in both States 0 and 1. Therefore, when the capacitor configuration changes to State 0, the relationship between $V_{IN}$ 102 and $V_{OUT}$ 104 can be computed as $V_{IN}=2\times V_{SW1}=2\times V_{OUT}$. Therefore, the output voltage $V_{OUT}$ 108 can be set to ½ of $V_{IN}$ 104 in this specific example. This SC regulator is sometimes referred to as a 2:1 step-down SC regulator, or a 2:1 SC regulator in short. The output load that consumes the current 112 can be any type of an electronic device, including a processor, memory (e.g., DRAM, NAND flash), a radio frequency chip, a WiFi combo chip, and/or a power amplifier.

Oftentimes, the voltage conversion ratio at which the SC regulator achieves a high efficiency is determined by the number of stacked capacitors between the input node and the ground during State 0. For example, in FIG. 1A, the number of stacked capacitors between the input node (e.g., the node at which the input voltage $V_{IN}$ 104 is provided) and the ground node is 2. Therefore, the SC regulator achieves a high efficiency when its output voltage $V_{OUT}$ is ½ of the input voltage $V_{IN}$ 104. When the number of stacked capacitors between the input node and the ground node is increased to N, the SC regulator can achieve a high efficiency when its output voltage is 1/N of the input voltage $V_{IN}$ 104.

FIGS. 2A-2B illustrate an example of the operation of a switch matrix in an exemplary 2:1 SC regulator. This switch matrix includes four power switches $P_{TOP}$ 202, $N_{MID}$ 204, $P_{MID}$ 206, and $N_{BOT}$ 208 alternating between State0 and State1 to regulate $V_{OUT}$ 108 to be close to ½ of $V_{IN}$ 104. In FIG. 2A, the black power switch indicates a switch in a "closed" state; and the grayed-out power switch indicates a switch in an "open" state. FIG. 2B illustrates exemplary waveforms indicating gate voltage signals (i.e., gate drive signals) at four gate nodes $P_{TOP\_G}$ 210, $N_{MID\_G}$ 212, $P_{MID\_G}$ 214, and $N_{BOT\_G}$ 216 of the four power switches $P_{TOP}$ 202, $N_{MID}$ 204, $P_{MID}$ 206, and $N_{BOT}$ 208, respectively. $V_{MID}$ 218 can be connected to $V_{OUT}$ 108 or can be supplied by another voltage regulator that generates a voltage close to ½ of the input voltage $V_{IN}$ 104.

As illustrated in FIG. 2B, $P_{TOP\_G}$ 210 and $N_{MID\_G}$ 212 can share the same gate drive signal because the voltage levels at the gate nodes $P_{TOP\_G}$ 210 and $N_{MID\_G}$ 212 are identical over time. Similarly, $P_{MID\_G}$ 214 and $N_{BOT\_G}$ 216 can share the same gate drive signal. There is a dead time 220 between the turn off time of $P_{TOP\_G}$ 210 and turn on time of $N_{MID\_G}$ 212 to avoid a scenario in which both switches $P_{TOP\_G}$ 210 and $N_{MID\_G}$ 212 are turned on at the same time, which can lead to the malfunctioning of the SC regulator.

Switches in the switch matrix are driven on and off within each period. In other words, the gate node (e.g., the control node) of the switches transition from a high voltage level to a low voltage level, and then from the low voltage level to the high voltage level within a single period. Such a periodic switching causes the parasitic capacitances at the gate node of switches to charge and discharge within a single period. Such charging and discharging of the parasitic capacitances causes a parasitic capacitance loss, or sometimes referred to as a switching loss. This parasitic capacitance loss limits the efficiency of an SC regulator.

The present disclosure provides an SC regulator that can limit the parasitic capacitance loss through charge recycling. The charge-recycling SC regulator includes two or more regulator modules that are operating out of phase. Each regulator module can include an independent SC regulator, and the regulator modules can share a common decoupling capacitor at the output node of the charge-recycling SC regulator.

The charge-recycling SC regulator is designed based on the principle that one gate drive signal provided to a first regulator module (hereinafter the first gate drive signal) and one gate drive signal provided to a second regulator module (hereinafter the second gate drive signal) can be synchronized in time, but opposite in polarity. In other words, the first drive signal and the second drive signal can be designed to transition from one voltage level to another voltage level at substantially the same time, but in opposite directions. This allows the SC regulator to recycle the charge that would have been wasted by the first regulator module to charge the parasitic capacitance in the second regulator module. Because the parasitic charge that would ordinarily be lost is recycled to charge another parasitic capacitance, the parasitic capacitance loss is reduced. This allows the SC regulator to improve its efficiency.

Figure 3B:
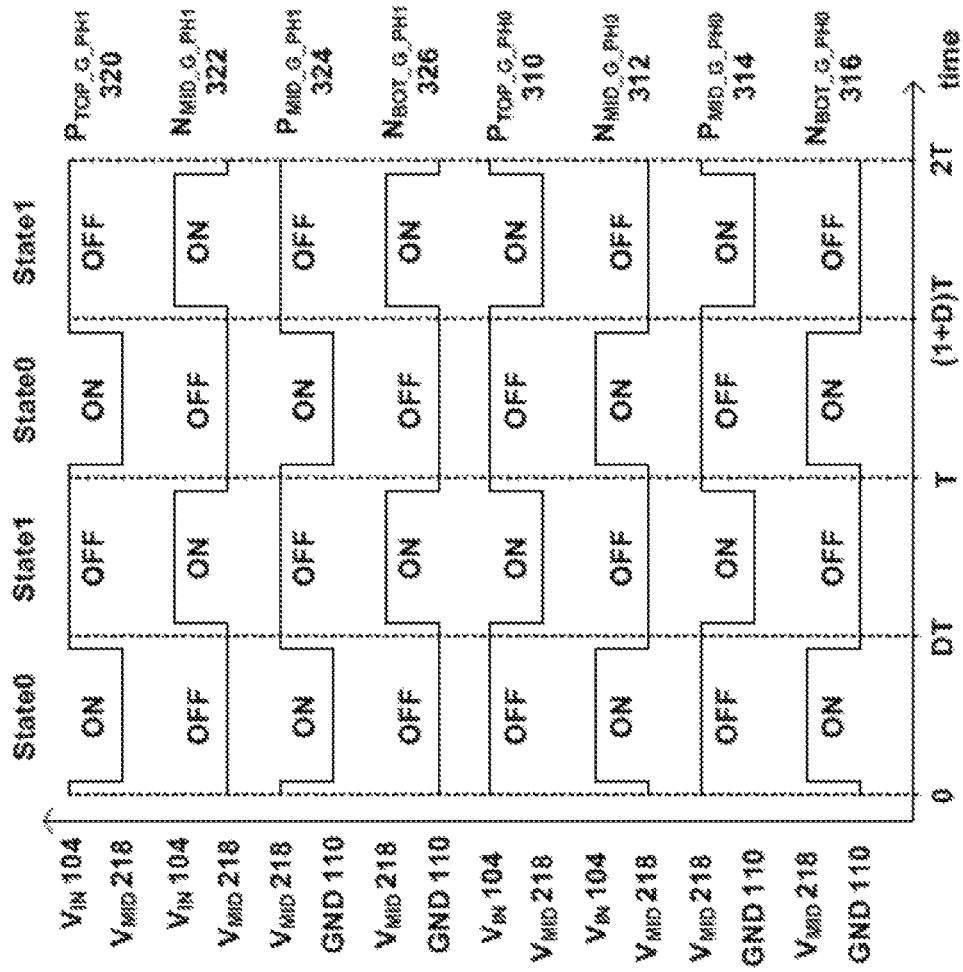
Figure 3C:
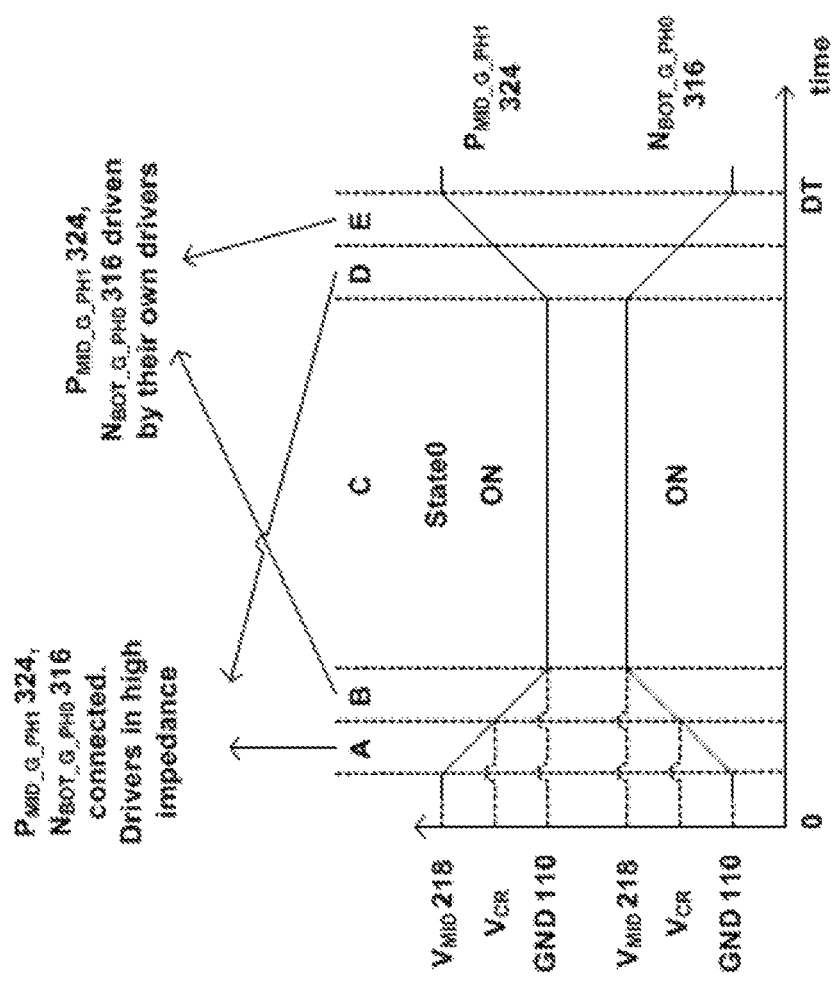

FIGS. 3A-3C illustrate an example of the operation of an example 350 of a charge-recycling two phase SC regulator in accordance with some embodiments. In FIG. 3A, the two-phase SC regulator 350 includes a first SC regulator module 352 and a second SC regulator module 354. The second SC regulator module 354 is a duplicate copy of the first SC regulator module 352, and the first SC regulator module 352 can operate in a first phase and the second SC regulator module 354 can operate in a second phase. For example, the second SC regulator module 354 can operate N degrees out of phase with respect to the first SC regulator module 352. The value of N can be any number between 0 and 360. Multi-phase operation can be beneficial because it distributes the current among multiple phases, making the design more modular and reducing parasitic resistive losses. Also, it can reduce the ripple on the output voltage $V_{OUT}$ 108.

FIG. 3B illustrates gate drive signals for switches in the first SC regulator module 352 and the second SC regulator module 354 in accordance with some embodiments. As shown in FIG. 3B, one gate drive signal for the first SC regulator module 352 and one gate drive signal for the second SC regulator module 354 can be synchronized in time, but opposite in polarities. For example, $P_{MID\_G\_PH1}$ 332, connected to the switch $P_{MID\_PH1}$ 324 in the second SC regulator module 354, and $N_{BOT\_G\_PH0}$ 316, connected to the switch $N_{BOT\_PH0}$ 308 in the first SC regulator module 352, transition at substantially the same time, but in opposite directions.

FIG. 3C shows a zoomed-in illustration of $P_{MID\_G\_PH1}$ 332 and $N_{BOT\_G\_PH0}$ 316 in accordance with some embodiments. In particular, FIG. 3C zooms into the rising and falling edges of $P_{MID\_G\_PH1}$ 332 and $N_{BOT\_G\_PH0}$ 316 between the time period 0 and DT of FIG. 3B.

As the gate drive signals $P_{MID\_G\_PH1}$ 332 transitions from a high voltage value ($V_{MID}$) to a low value (GND), the SC regulator operates in two stages: stage A and stage B.

In stage A, as $P_{MID\_G\_PH1}$ 332 transitions from a high voltage value ($V_{MID}$) to a low value (GND), the gate voltage drivers (e.g., inverters or buffers that generate signals to drive switches) for $P_{MID\_PH1}$ 324 and $N_{BOT\_PH0}$ 308 are placed at a high impedance state. This way, the gate voltage drivers for $P_{MID\_PH1}$ 332 and $N_{BOT\_PH0}$ 308 do not interfere with the charge recycling that subsequently takes place. Subsequently, the SC regulator performs charge recycling. In particular, the SC regulator connects the gate terminals of $P_{MID\_PH1}$ 324 and $N_{BOT\_PH0}$ 308 through a switch 362. In other words, the SC regulator shorts the signals $P_{MID\_G\_PH1}$ 332 and $N_{BOT\_G\_PH0}$ 316. Due to the shorting, the parasitic capacitance at the gate node of $P_{MID\_PH1}$ 324 is discharged and the gate voltage of $P_{MID\_PH1}$ 324 drops from $V_{MID}$ 218 to $V_{CR}$, where $V_{CR}$ can be any value between GND and $V_{MID}$. The $V_{CR}$ value is determined by the gate capacitance ratio of $P_{MID\_PH1}$ 324 and $N_{BOT\_PH0}$ 308. The discharged charge from $P_{MID\_PH1}$ 324 is routed to charge the parasitic capacitance at the gate node of $N_{BOT\_PH0}$ 308, and the gate voltage of $N_{BOT\_PH0}$ 308 increases from GND 110 to $V_{CR}$. In other words, the discharged charge from the gate node of $P_{MID\_PH1}$ 324 is recycled to charge the gate node of $N_{BOT\_PH0}$ 308 from GND 110 to $V_{CR}$.

In stage B, once these two signals $P_{MID\_G\_PH1}$ 332 and $N_{BOT\_G\_PH0}$ 316 reach a similar voltage level (e.g., around $V_{CR}$), the gate nodes of $P_{MID\_PH1}$ 324 and $N_{BOT\_PH0}$ 308 are disconnected (e.g., by turning off the switch between them) and the gate signal drivers of $P_{MID\_PH1}$ 324 and $N_{BOT\_PH0}$ 308 are enabled to drive $P_{MID\_G\_PH1}$ 332 to GND and to drive $N_{BOT\_G\_PH0}$ 316 to $V_{MID}$, respectively. This completes the charge recycling process.

In stage C, $P_{MID\_PH1}$ 324 and $N_{BOT\_PH0}$ 308 are both turned on. As the gate drive signals $N_{BOT\_G\_PH0}$ 316 transitions from a high voltage value ($V_{MID}$) to a low value (GND), the SC regulator operates in two stages: stage D and stage E. The operation of stages D and E is similar to stages A and B, except that the discharged charge from $N_{BOT\_PH0}$ 308 is used to charge $P_{MID\_PH1}$ 324.

In some embodiments, the length of stages A and D can be predetermined based in part on the effective RC time constant at the gate nodes of $P_{MID\_PH1}$ 324 and $N_{BOT\_PH0}$ 308. In other embodiments, the length of stages A and D is adjusted based on how quickly the two signals $P_{MID\_G\_PH1}$ 332 and $N_{BOT\_G\_PH0}$ 316 reach the similar voltage level. For example, the signals $P_{MID\_G\_PH1}$ 332 and $N_{BOT\_G\_PH0}$ 316 can be connected to a sense amplifier that is configured to determine whether the difference between the two signals $P_{MID\_G\_PH1}$ 332 and $N_{BOT\_G\_PH0}$ 316 is less than a predetermined threshold. When the sense amplifier indicates that the difference between the two signals $P_{MID\_G\_PH1}$ 332 and $N_{BOT\_G\_PH0}$ 316 is less than the predetermined threshold, the SC regulator can cause the regulator modules 352, 354 to enter into stage B.

In some embodiments, the disclosed charge recycling scheme reduces the parasitic capacitance loss by one-half. The energy needed to charge a capacitor can be computed as $CV_A(V_B-V_A)$, where C is the capacitance value, $V_A$ is the initial voltage of the capacitor, and $V_B$ is the final voltage of the capacitor after charging is finished. Therefore, without charge recycling, the energy needed to charge the gate capacitor of $P_{MID\_PH1}$ 324 or $N_{BOT\_PH0}$ 308 is $CV_{MID}(V_{MID}-0)=CV_{MID}^2$. However, with charge recycling, if $V_{CR}$ is equal to $V_{MID}/2$, the energy needed to charge the gate capacitor of $P_{MID\_PH1}$ 324 or $N_{BOT\_PH0}$ 308 is $CV_{MID}(V_{MID}-V_{MID}/2)=CV_{MID}^2/2$, which is half of the energy that would have been spent without charge recycling, because charging the gate capacitor of $P_{MID\_PH1}$ 324 or $N_{BOT\_PH0}$ 308 from GND to $V_{MID}/2$ does not require any energy.

In some embodiments, charge recycling can be applied to any pair of switches that are driven by synchronized, opposite-polarity gate drive signals. For example, in FIG. 3A, charge recycling can be applied to the following drive signal pairs: ($P_{TOP\_G\_PH1}$ 328, $N_{MID\_G\_PH0}$ 312), ($N_{MID\_G\_PH1}$ 330, $P_{TOP\_G\_PH0}$ 310), ($P_{MID\_G\_PH1}$ 332, $N_{BOT\_G\_PH0}$ 316), and ($N_{BOT\_G\_PH1}$ 334, $P_{MID\_G\_PH0}$ 314).

In some embodiments, one or more gate drive signals can be time-shifted, or the phase between regulator modules in a multi-phase SC regulator can be adjusted to enable more charge recycling. To apply charge recycling between two switches, the drive signals provided to the two switches should be synchronized, have opposite polarities, and have the identical voltage swing. For example, when a first drive signal and a second drive signal are the subject of charge recycling, the first drive signal can transition from 0 to 1V, while the second drive signal can transition from 1 to 0V around the same time.

In some embodiments, to increase the number of signal pairs that can perform charge recycling, the phase between regulator modules can be adjusted. If the phase difference is not even (e.g., not 120 degrees for a 3 phase regulator), the output voltage ripple could increase. Therefore, there can be a tradeoff between (1) increasing the number of signal pairs and (2) a larger output voltage ripple.

Figure 4A:
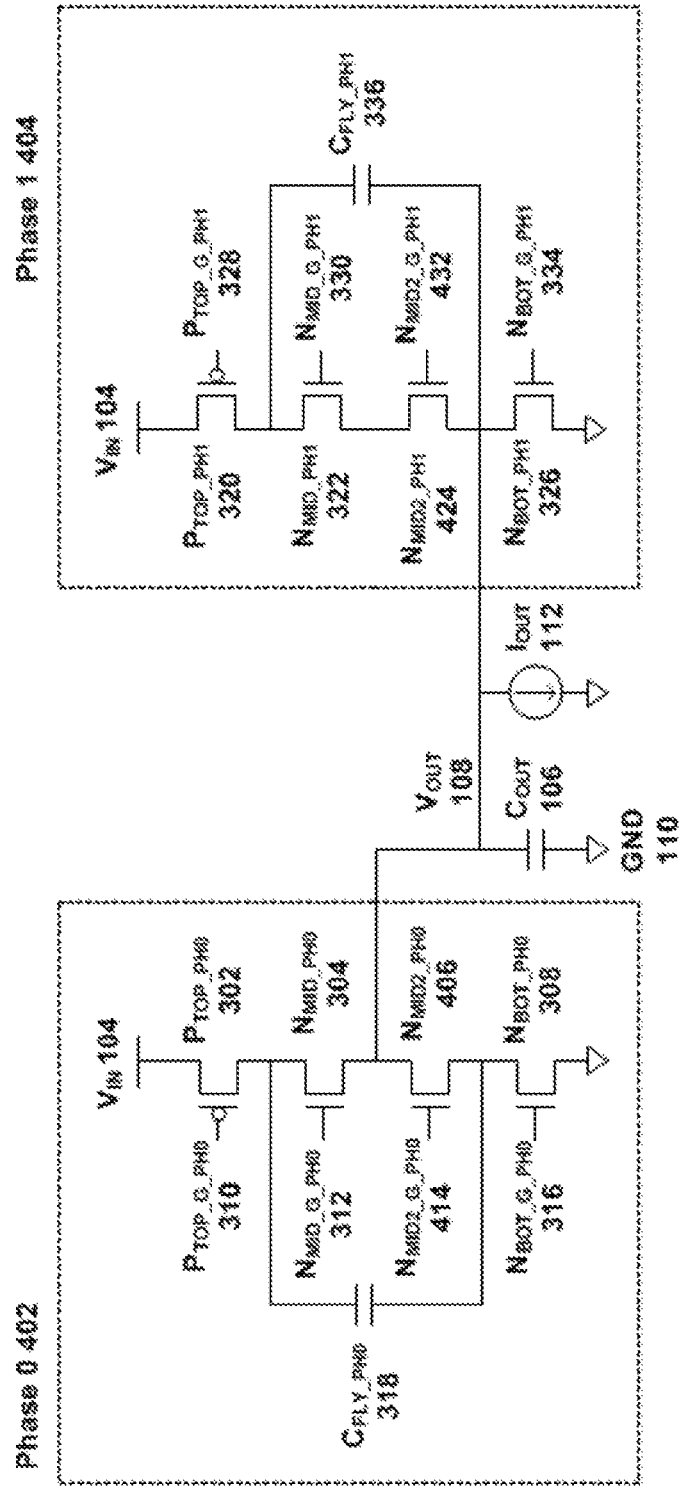
FIGS. 4A-4C illustrate an example of the operation of an example of another type of a charge-recycling two phase SC regulator in accordance with some embodiments.
Figure 4B:
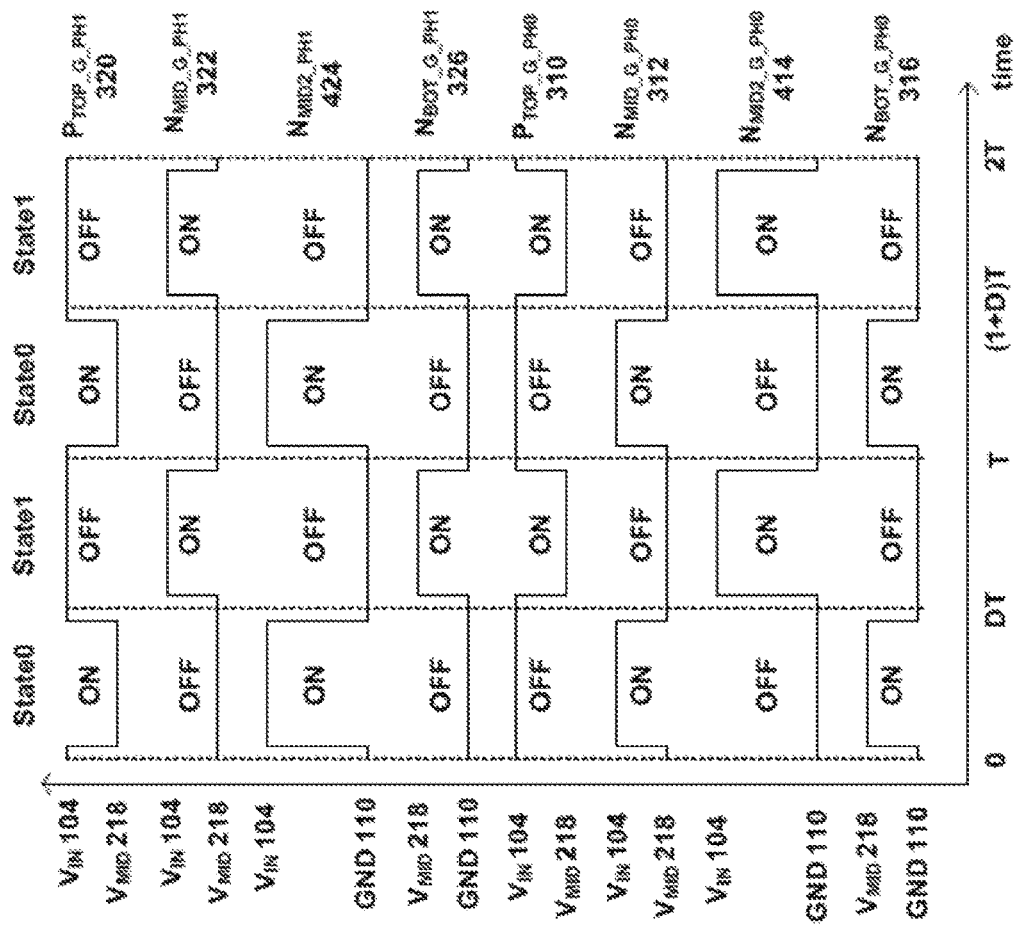
Figure 4C:
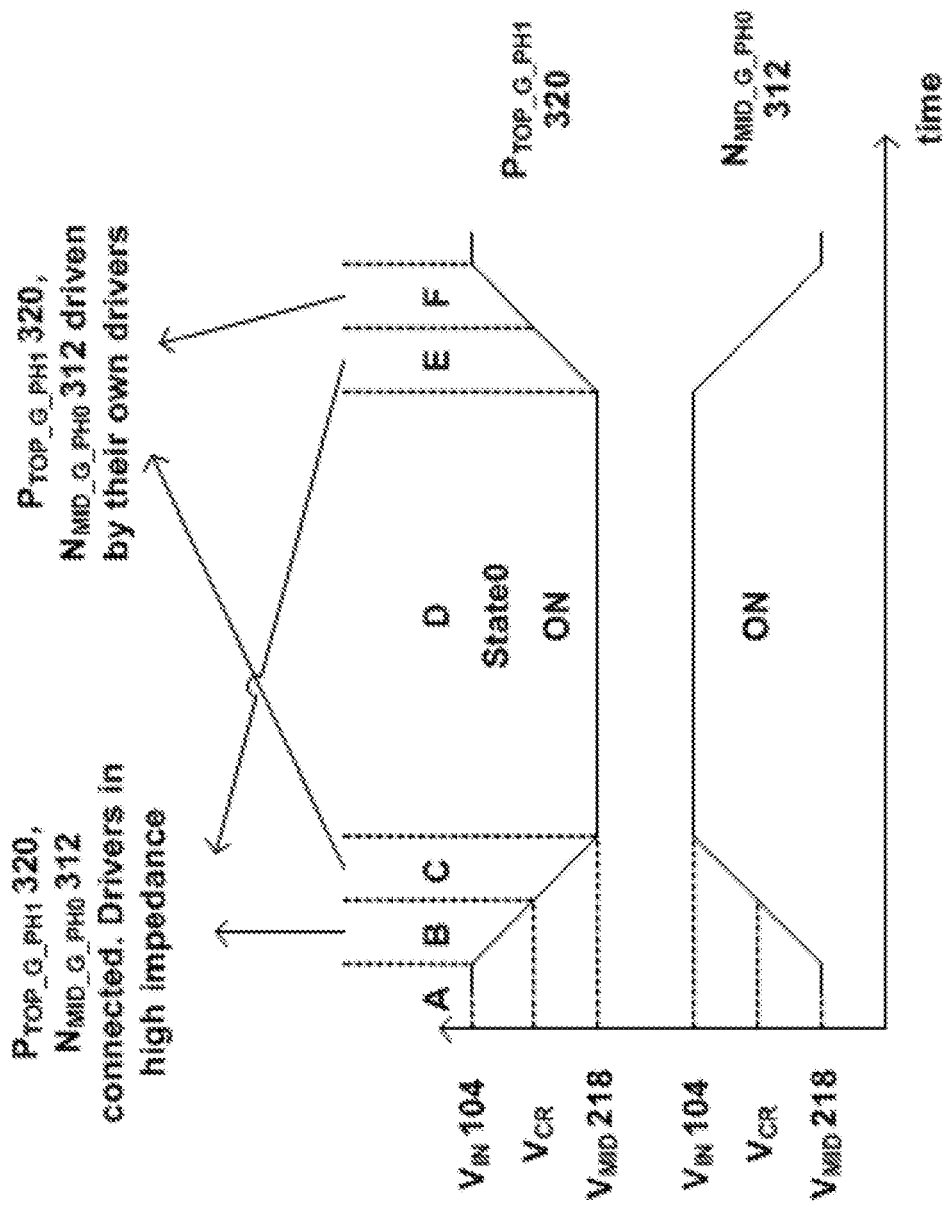

In some embodiments, other types of SC regulators can also use charge recycling as long as the SC regulator uses a pair of gate drive signals that share the same voltage swing and transition at substantially the same time, but in opposite directions. FIGS. 4A-4C illustrate an example of the operation of a charge-recycling two phase SC regulator in accordance with some embodiments. The two-phase SC regulator 400 includes a first SC regulator module 402 and a second SC regulator module 404. The second SC regulator module 404 is a duplicate copy of the first SC regulator module 402, and the first SC regulator module 402 can operate in a first phase and the second SC regulator module 404 can operate in a second phase.

The regulator used in the first SC regulator module 402 or the second SC regulator module 404 is different from the regulator used in the first SC regulator module 352 or the second SC regulator module 354 in that the regulator used in the first SC regulator module 402 or the second SC regulator module 404 uses three NMOS transistors and one PMOS transistor, rather than two NMOS transistors and two PMOS transistors. In this configuration, ($P_{TOP\_G\_PH1}$ 328, $N_{MID\_G\_PH0}$ 312), ($N_{MID\_G\_PH1}$ 330, $P_{TOP\_G\_PH0}$ 310) pairs can use charge recycling. This is illustrated in FIGS. 4B and 4C.

In some embodiments, a multi-phase SC regulator can have two or more regulator modules that operate with different duty cycles. For example, when the multi-phase SC regulator includes two regulator modules, one regulator module can operate with a duty cycle of D and another regulator module can operate with a duty cycle of 1-D.

FIG. 6A illustrates an example of a multi-phase SC regulator with regulator modules operating with an identical duty cycle. Here, the multi-phase SC regulator includes a first regulator module operating at phase0 (PH0) and a second regulator module operating at phase1 (PH1). The first regulator module and the second regulator module both operate with a duty cycle D. However, the second regulator module is operating at PH1 that is delayed by PH*T compared to PH0. In this case, there are no signal pairs to do charge-recycling.

In contrast, FIG. 6B illustrates a multi-phase SC regulator with regulator modules operating with different duty cycles in accordance with some embodiments. As in FIG. 6A, the multi-phase SC regulator includes a first regulator module operating at phase0 (PH0) and a second regulator module operating at phase1 (PH1). However, the first regulator module and the second regulator module operate with a duty cycle D and 1-D, respectively. Furthermore, PH1 is phase shifted to increase the number of signal edges that coincides with the signals at PH0. In buck regulators, operating regulator modules at different duty cycles can be problematic because different duty cycles D and 1-D can result in different output voltages. However, in SC regulators, operating regulator modules at different duty cycles is not as problematic because duty cycles D and 1-D result in similar output voltages.

In some embodiments, an SC regulator can operate with more than two interleaved phases. Even for such N-interleaved phase SC regulator, the same charge recycling technique can be used to improve the efficiency.

In some embodiments, the charge recycling regulator can operate in an N:M voltage conversion mode in which the output voltage of the regulator is (N/M) times the input voltage of the regulator.

In some embodiments, the charge recycling regulator can be operated as a battery charger. For example, an input node of the charge recycling regulator can be coupled to a power source, e.g., a power line of a Universal Serial Bus (USB), and an output node of the charge recycling regulator can be coupled to a battery so that the output voltage and the output current of the charge recycling regulator are used to charge the battery.

In some embodiments, the above-identified configuration, in which a battery is charged using a USB power line, can be used in reverse as a USB On-The-Go (OTG), where the battery in a first device can deliver power to a second device over USB to charge the second device. In this scenario, a battery in a first device is configured to deliver current to a battery in a second device through a USB. Although the output voltage of the battery in the first device may be lower than the USB power line voltage, the reconfigurable Dickson-Star SC regulator can operate in a step-up configuration to step-up the output voltage of the battery to that of the USB power line. This way, the battery in the first device can charge the battery in the second device over the USB power line.

Figure 7A:
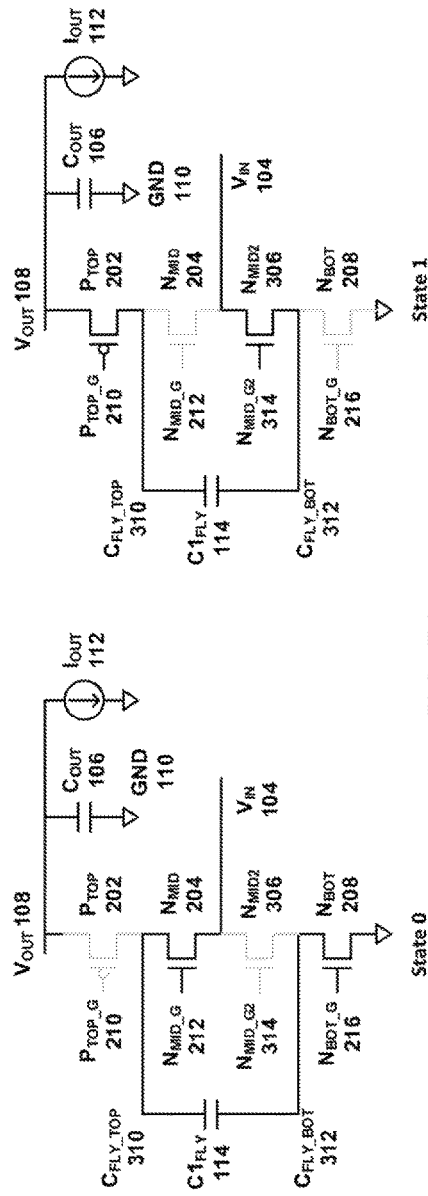
FIGS. 7A-7C illustrate an example of the operation of a switch matrix in an example 2:1 SC regulator using an NMOS power switch in a step-up mode in accordance with some embodiments.
Figure 7C:
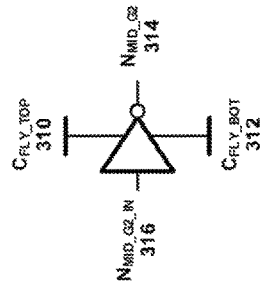
Figure 7B:
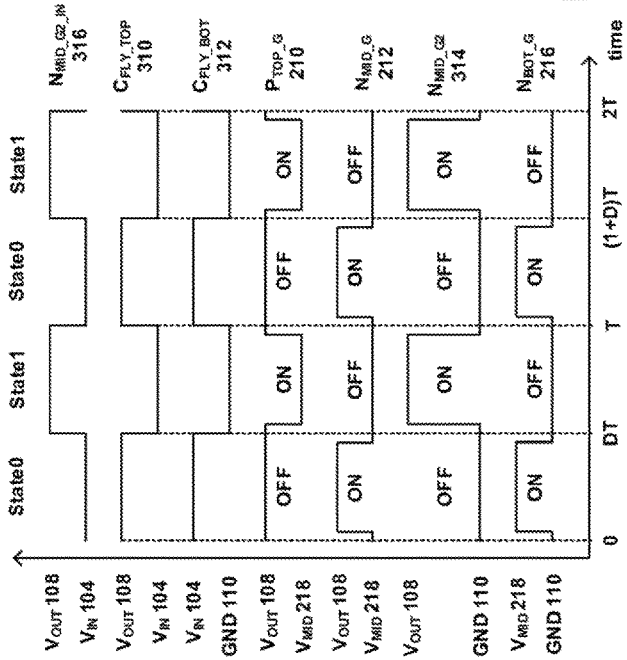

FIGS. 7A-7C show an example of a regulator using an NMOS power switch in a step-up configuration that can be used for each of the two regulators of FIGS. 4A-4C. Similarly to the regulators of FIGS. 4A-4C, the regulator of FIG. 7A can be operated in accordance with the timing diagram shown in FIG. 7B and utilize the flying inverter of FIG. 7C to provide signal $N_{MID\_G2}$ 314 to switch $N_{MID2}$ 306 of FIG. 7A. When used in a two-phase, charge recycling configuration, the regulator illustrated in FIG. 7A can replace each of the two regulators in FIG. 4A, the outputs of each of the regulators can be connected together, and each of the regulators can be operated 180 degrees out of phase. As described above, to facilitate charge recycling, matching gate signals can be coupled.

Figure 8A:
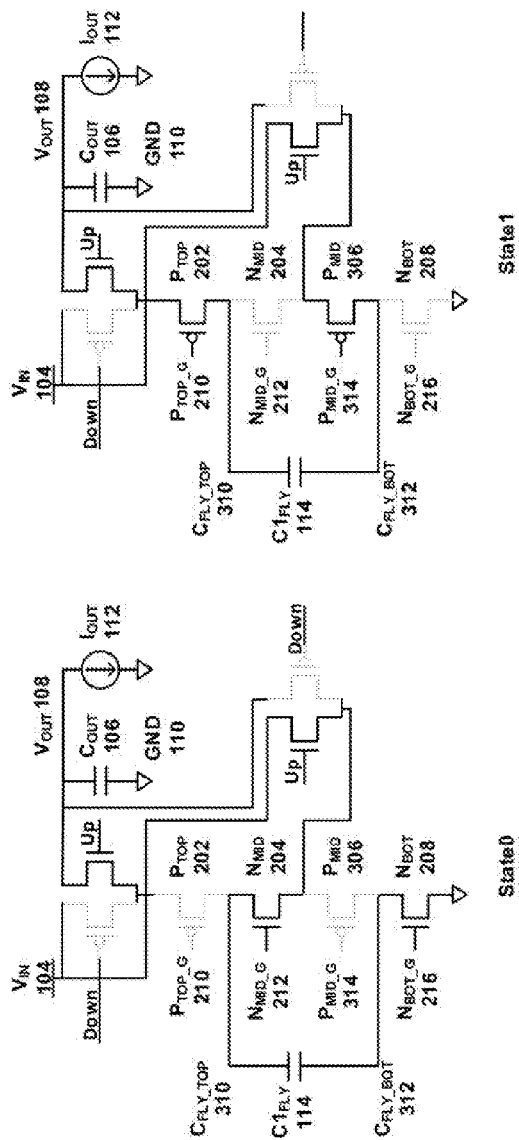
FIGS. 8A-8B illustrate an example of the operation of a switch matrix in an example 2:1 SC regulator using a PMOS power switch in a step-up mode in accordance with some embodiments.
Figure 8B:
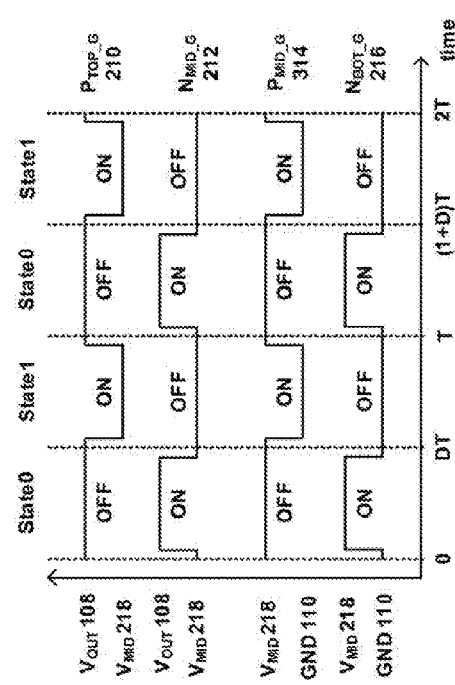

FIGS. 8A-8B show an example of a regulator using an PMOS power switch in a step-up configuration that can be used for each of the two regulators of FIGS. 3A-3C. Similarly to the regulators of FIGS. 3A-3C, the regulator of FIG. 8A can be operated in accordance with the timing diagram shown in FIG. 8B. When used in a two-phase, charge recycling configuration, the regulator illustrated in FIG. 8A can replace each of the two regulators in FIG. 3A, the outputs of each of the regulators can be connected together, and each of the regulators can be operated 180 degrees out of phase. As described above, to facilitate charge recycling, matching gate signals can be coupled.

Figure 9:
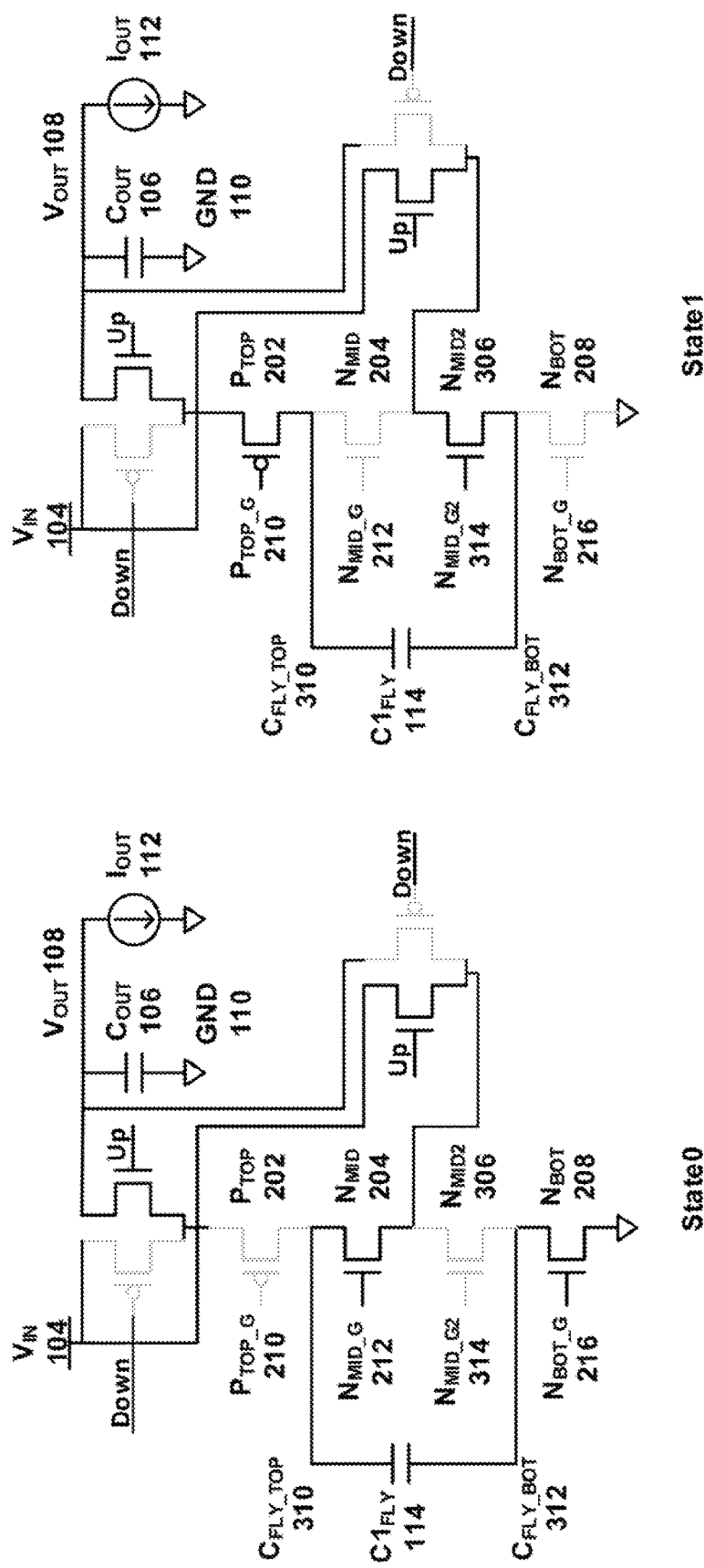
FIG. 9 illustrates an example of the operation of a switch matrix in an example 2:1 SC regulator using an NMOS power switch and configurable to use a step-up mode or a step-down mode in accordance with some embodiments.

FIG. 9 illustrates an example of a regulator like the regulator illustrated in FIGS. 4A and 7A that includes an NMOS power switch and that can be operated in either the step-up or the step-down mode. FIG. 9 specifically shows its regulator in the step-up mode due to the switches having their gates connected to signal "Up" turned on and the switches having their gates connected to signal "Down" turned off. While in the step-up mode, the circuit of FIG. 9 can be operated according to the timing diagram of FIG. 7B. In order to operate the regulator of FIG. 9 in the step-down mode, the switches having their gates connected to signal "Down" can be turn on and the switches having their gates connected to signal "Up" can be turned off. While in the step-down mode, the circuit of FIG. 9 can be operated according to the timing diagram of FIG. 4B.

Figure 10:
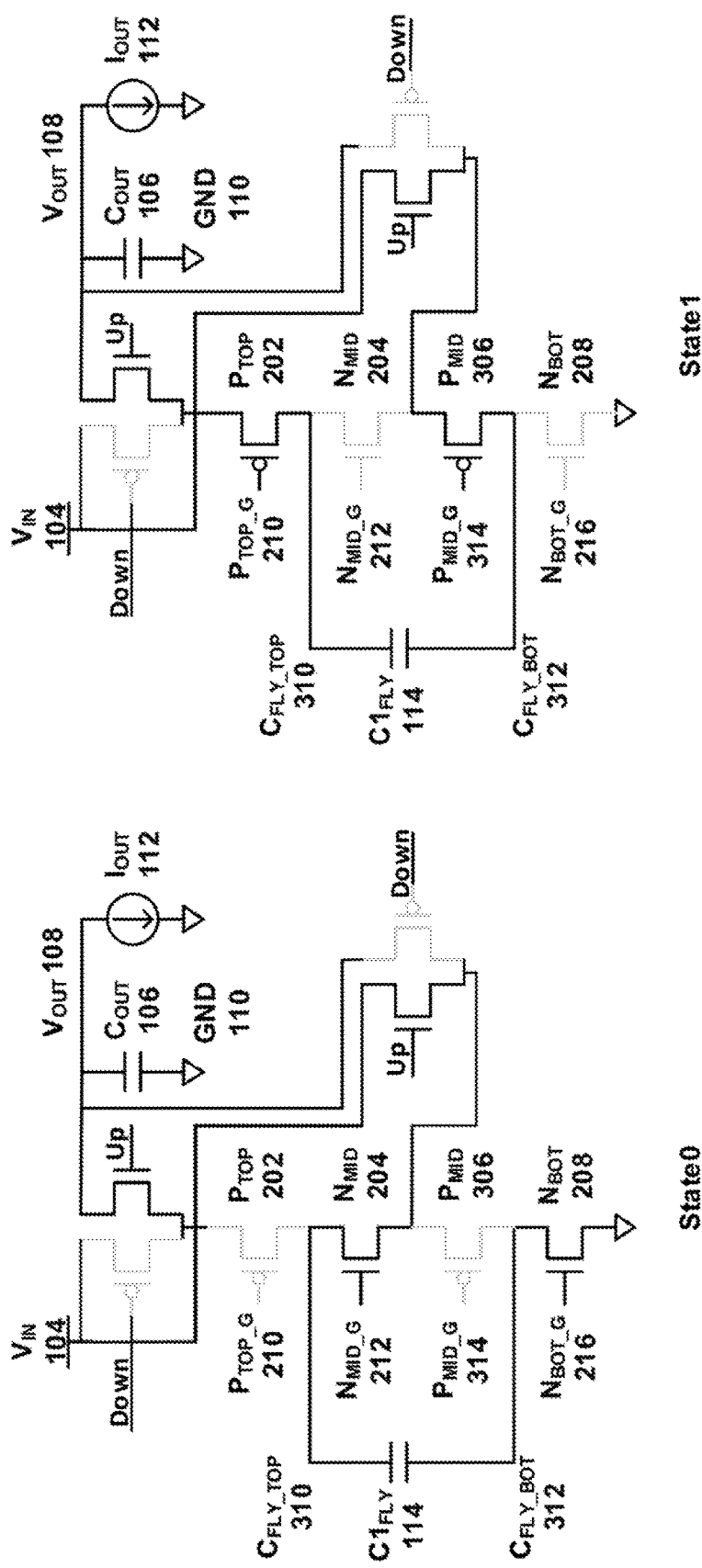
FIG. 10 illustrates an example of the operation of a switch matrix in an example 2:1 SC regulator using a PMOS power switch and configurable to use a step-up mode or a step-down mode in accordance with some embodiments.

FIG. 10 illustrates an example of a regulator like the regulator illustrated in FIGS. 3A and 8A that includes a PMOS power switch and that can be operated in either the step-up or the step-down mode. FIG. 10 specifically shows its regulator in the step-up mode due to the switches having their gates connected to signal "Up" turned on and the switches having their gates connected to signal "Down" turned off. While in the step-up mode, the circuit of FIG. 10 can be operated according to the timing diagram of FIG. 8B. In order to operate the regulator of FIG. 10 in the step-down mode, the switches having their gates connected to signal "Down" can be turn on and the switches having their gates connected to signal "Up" can be turned off. While in the step-down mode, the circuit of FIG. 10 can be operated according to the timing diagram of FIG. 3B.

Figure 5:
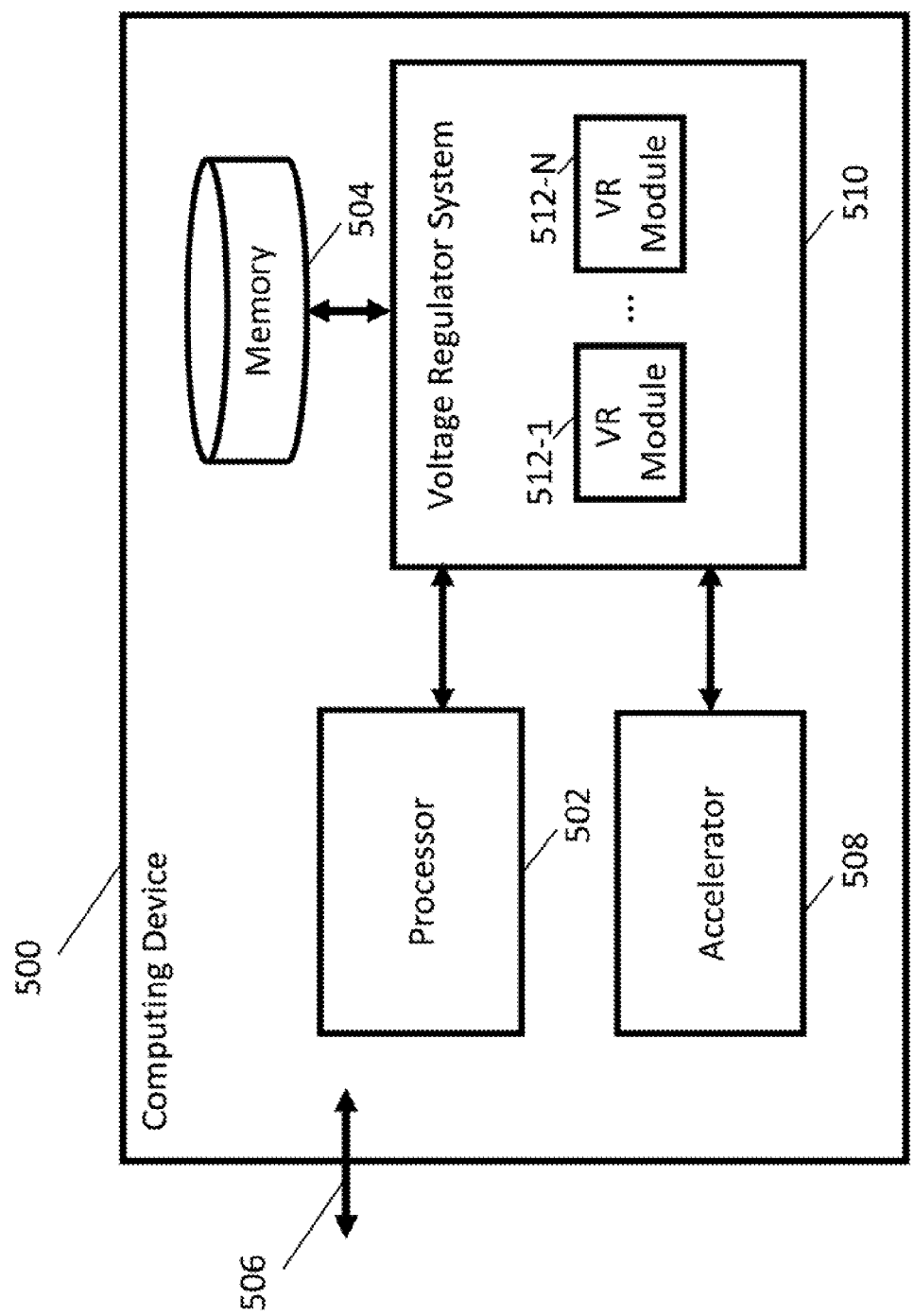
FIG. 5 is a block diagram of an example of a computing device that includes a switching capacitor regulator in accordance with some embodiments.

FIG. 5 is a block diagram of a computing device that includes a switching capacitor regulator in accordance with some embodiments. The computing device 500 includes a processor 502, memory 504, one or more interfaces 506, an accelerator 508, and a regulator system 510. The computing device 500 may include additional modules, fewer modules, or any other suitable combination of modules that perform any suitable operation or combination of operations.

In some embodiments, the accelerator 508 can be implemented in hardware using an application specific integrated circuit (ASIC). The accelerator 508 can be a part of a system on chip (SOC). In other embodiments, the accelerator 508 can be implemented in hardware using a logic circuit, a programmable logic array (PLA), a digital signal processor (DSP), a field programmable gate array (FPGA), or any other integrated circuit. In some cases, the accelerator 508 can be packaged in the same package as other integrated circuits.

In some embodiments, the regulator system 510 can be configured to provide a supply voltage to one or more of the processor 502, memory 504, and/or an accelerator 508. The regulator system 510 can include one or more voltage regulator (VR) modules 512-1 . . . 512-N. In some embodiments, one or more of the VR modules 512-1 . . . 512-N can be a charge recycling SC regulator, for example, as disclosed in FIGS. 3A and 4A. In some embodiments, the one or more VR modules 512-1 . . . 512-N may operate in multiple interleaved phases.

In some embodiments, the voltage regulator system 510 can include a switch control module that is configured to control the switch configuration in one or more VR modules 512-1 . . . 512-N. For example, when the switch control module receives an instruction to operate an SC regulator, the switch control module can be configured to control the switch matrix to operate the SC regulator in a 2:1 conversion mode. As another example, when the switch control module receives an instruction to operate the SC regulator in a different conversion mode, the switch control module can be configured to control the switch matrix to operate the SC regulator in the different conversion mode. In some embodiments, the switch control module can be synthesized using hardware programming languages. The hardware programming languages can include Verilog, VHDL, Bluespec, or any other suitable hardware programming language. In other embodiments, the switch control module can be manually designed and can be manually laid-out on a chip.

The computing device 500 can communicate with other computing devices (not shown) via the interface 506. The interface 506 can be implemented in hardware to send and receive signals in a variety of mediums, such as optical, copper, and wireless, and in a number of different protocols, some of which may be non-transient.

In some embodiments, the computing device 500 can include user equipment. The user equipment can communicate with one or more radio access networks and with wired communication networks. The user equipment can be a cellular phone having telephonic communication capabilities. The user equipment can also be a smart phone providing services such as word processing, web browsing, gaming, e-book capabilities, an operating system, and a full keyboard. The user equipment can also be a tablet computer providing network access and most of the services provided by a smart phone. The user equipment operates using an operating system such as Symbian OS, iPhone OS, RIM's Blackberry, Windows Mobile, Linux, HP WebOS, Tizen, Android, or any other suitable operating system. The screen might be a touch screen that is used to input data to the mobile device, in which case the screen can be used instead of the full keyboard. The user equipment can also keep global positioning coordinates, profile information, or other location information. The user equipment can also be a wearable electronic device.

The computing device 500 can also include any platforms capable of computations and communication. Non-limiting examples include televisions (TVs), video projectors, set-top boxes or set-top units, digital video recorders (DVR), computers, netbooks, laptops, and any other audio/visual equipment with computation capabilities. The computing device 500 can be configured with one or more processors that process instructions and run software that may be stored in memory. The processor also communicates with the memory and interfaces to communicate with other devices. The processor can be any applicable processor such as a system-on-a-chip that combines a CPU, an application processor, and flash memory. The computing device 500 can also provide a variety of user interfaces such as a keyboard, a touch screen, a trackball, a touch pad, and/or a mouse. The computing device 500 may also include speakers and a display device in some embodiments. The computing device 500 can also include a bio-medical electronic device.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, apparatuses, systems, and methods for carrying out the several purposes of the disclosed subject matter. It is important, therefore, that the subject matter be regarded as including such equivalent constructions insofar as they do not depart from the spirit and scope of the disclosed subject matter.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A voltage regulator comprising:
 a first regulator module comprising a first transistor switch, wherein the first regulator module operates in a first phase and wherein the first transistor switch is configured to receive a first gate drive signal at a gate of the first transistor switch from a first signal driver;
 a second regulator module comprising a second transistor switch, wherein the second regulator module operates in a second phase that is different from the first phase, wherein the second transistor switch is configured to receive a second gate drive signal at a gate of the second transistor switch from a second signal driver, and wherein the second gate drive signal is opposite in polarity from the first gate drive signal; and
 a switch that couples the gate of the first transistor switch and the gate of the second transistor switch during at least part of a time period during which the first transistor switch transitions from one state to another and the second transistor switch transitions from one state to another such that charge flows from one of the gate of the first transistor switch and the gate of the second transistor switch to another of the gate of the first transistor switch and the gate of the second transistor switch when the switch is closed.

2. The voltage regulator of claim 1, wherein, when the switch couples the gate of the first transistor switch and the gate of the second transistor switch, the first signal driver and the second signal driver are each configured to have a high output impedance.

3. The voltage regulator of claim 1, wherein, when a difference between a first voltage level at the gate of the first transistor switch and a second voltage level at the gate of the second transistor switch is greater than a predetermined threshold, the switch is closed.

4. The voltage regulator of claim 1, wherein, when a difference between a first voltage level at the gate of the first transistor switch and a second voltage level at the gate of the second transistor switch is less than a predetermined threshold, the switch is open.

5. The voltage regulator of claim 4, where, when the switch is opened, the first signal driver and the second signal driver are each configured to not have a high output impedance.

6. The voltage regulator of claim 1, wherein, when after the switch has been coupling the gate of the first transistor switch and the gate of the second transistor switch for a predetermined period of time, the switch opens.

7. The voltage regulator of claim 6, where, when the switch is opened, the first signal driver and the second signal driver are each configured to not have a high output impedance.

8. The voltage regulator of claim 3, where, when the switch is closed, the first signal driver and the second signal driver are each configured to have a high output impedance.

* * * * *